July 9, 1929.  J. BING  1,720,203
DIESEL LOCOMOTIVE CONTROL
Filed April 12, 1927
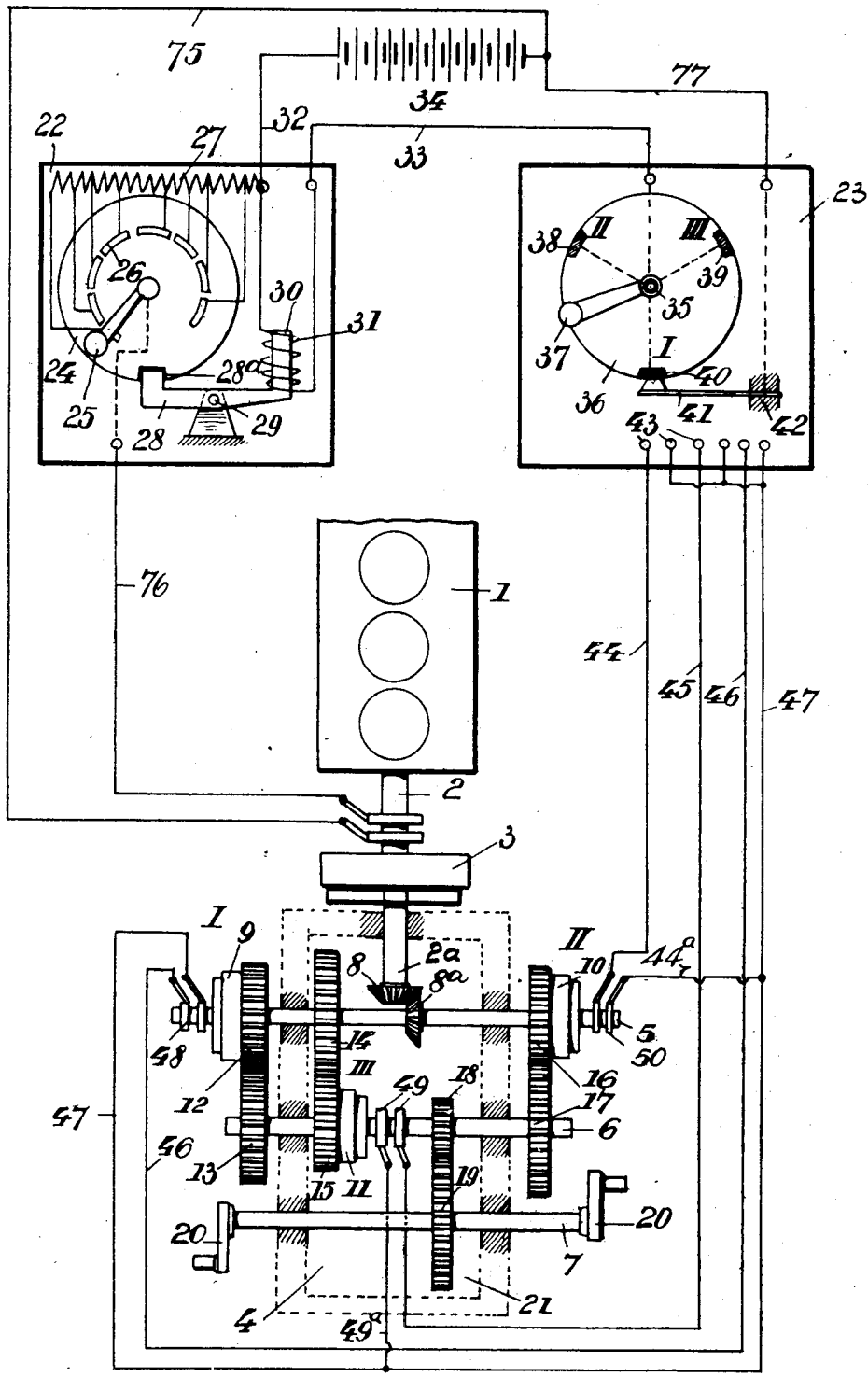
Inventor:
Julius Bing,
By his Att'y Harold J. Penny Patented July 9, 1929.

1,720,203

UNITED STATES PATENT OFFICE.

JULIUS BING, OF EISENACH, GERMANY, ASSIGNOR TO THE FIRM MAGNET-WERK G. M. B. H. EISENACH SPEZIALFABRIK FÜR ELEKTROMAGNET-APPARATE, OF EISENACH, GERMANY.

DIESEL-LOCOMOTIVE CONTROL.

Application filed April 12, 1927, Serial No. 183,223, and in Germany April 14, 1926.

This invention relates to improvements in the controlling of Diesel-locomotives having a power transmission plant inserted between the Diesel-motor and the driving shaft or shafts of the locomotive and a variable speed drive forming part of said power transmission plant, whereby the change of speed is accomplished by means of electro-magnetically operated friction couplings associated with the several pairs of the gear-wheels for said variable speed drive. During transit from one speed to another furthermore an electro-magnetically operated main coupling is partly or fully released in order to avoid inconveniences connected with the couplings which are inserted in the variable speed drive. These inconveniences are mainly due to the sliding of said couplings, the undesirable heat produced thereby and the consequent excessive wear of the couplings.

The control of such locomotives has heretofore generally been accomplished by the actuation of one or more switching instrumentalities which control the current serving for the excitation of the electro-magnetically operating couplings. These switching instrumentalities have been constructed in the manner of the controller which are generally used in electric street cars or the like. For the operation of locomotives of the above defined kind, especially in view of the possibility of using such locomotives in countries where persons of skill and intelligence are not easily available, it is of utmost importance to avoid wrong connections, which could eventually result in dangers for the driving engine or for the transmission gear interposed between said engine and the driving shaft or shafts of the locomotive.

My present invention consists in providing means which prevent, that the controlling switch for the couplings in the speed changing gear can be moved into a position beyond that corresponding to a desired working position, as long as the shaft of the speed changing gear has not attained the proper speed which corresponds to the said working position of the switch. According to my invention this is attained by a retarding device adapted to prevent said main-coupling from being again put into operation after having been released for throwing in a new speed, before one of the couplings of the variable speed gear has attained its proper condition to be thrown into operation.

In the accompanying drawing a construction according to my invention is shown.

The driving motor or Diesel engine 1 which is mounted upon the frame of the locomotive, is provided with the shaft 2 carrying an electro-magnetically operated friction-coupling 3. The projecting end $2^a$ of the driving shaft 2 is carried into the interior of the casing 21 which contains the elements necessary for the variable speed drive. At the end of the driving shaft which projects into said casing there is mounted a bevel-gear 8 which meshes with a second bevel-gear $8^a$ mounted upon the shaft 5. Couplings 9 and 10 are mounted upon either end of the shaft 5 which is carried to the outside through the casing 21. These couplings are likewise constructed as electro-magnetic couplings. One coupling member of each of said couplings 9 and 10 is fixedly mounted upon the shaft 5, while the second coupling members of said couplings are loosely mounted upon said shaft 5. The said two members of the couplings are connected with gear-wheels 12 and 16 respectively. The gear-wheel 12 meshes with a gear-wheel 13 and the gear-wheel 16 with a gear-wheel 17. The gear-wheels 13 and 17 are mounted upon the shaft 6 at its ends which project from the casing 21. Besides, said shaft 6 carries a pinion 18 within the casing 21, which meshes with the gear-wheel 19 mounted on a third shaft 7. The shaft 7 is likewise carried through the casing and projects with both ends therefrom, said ends carrying each a crank 20, said cranks being in connection with the driving axles of the locomotive (not shown) by means of the usual coupling rods. Upon the shaft 6 there is further mounted an electro-magnetically operated friction coupling 11, the one member of this coupling being fixedly connected with said shaft, while the other which is in connection with a gear-wheel 15 is loosely mounted on said shaft, said gear-wheel meshing with another gear-wheel 14 which is fixedly mounted on the shaft 5. The exciting current is supplied to said couplings 9, 10 and 11 by means of slip-rings 48, 50 and 49 provided upon the respective shafts. The conductors 46, 47, 49ª and 45 as well as the conductors 44 and 44ª lead to the terminals 43 of a controller which as a whole is designated by the numeral 23, said controller comprising the usual contact drum 36 which is provided with three contact pieces 38, 39 and 40, a resilient contact 41 fixed at the point 42 coming in engagement with said contact pieces 38, 39 and 40. The contact drum 36 may be rotated by means of a handle 37 around the axis 35. The terminals 43 are connected by means of proper conductors (not shown) with the contact segments ordinarily provided on the cylindrical periphery of the drum 36. The contact pieces 38, 39 and 40 are connected with the axle of the drum 36, which itself is in conductive connection with one terminal of the coil 31 of a solenoid 30 by means of the conductor 33. The other terminal of said coil is connected by way of the conductor 32 to one pole of a current source 34, the other pole of said current source being connected by a conductor 77 with the contact 41.

The core of the solenoid 30 which is connected with the controller for the main coupling 3, said controller being designated as a whole by the numeral 22, forms the one end of a locking lever which is mounted in a bearing 29, said locking lever being able to come in engagement with a recess 28ª of a controlling disc 24. This controlling disc 24 is provided with a handle or contact arm 25 having a contact on its under side, said contact being able to alternately engage with the circularly arranged contact pieces 26. The disc 24 is rotatable with the arm 25, and the contacts 26 are stationary. The contact pieces 26 are connected with the ends of a number of serially connected resistances 27. The contact arm 25 is connected by the conductor 76 with one of the slip-rings mounted upon the shaft 2, whereby current may be supplied to the exciting winding of the main coupling 3. The other slip-ring on the shaft 2 is connected by the conductor 75 with one pole of the above-mentioned current source 34, the other pole of said current source being connected by the conductor 32 with the resistances 27.

The mode of operation of the afore-described arrangement is as follows:

If it is desired to put the variable speed drive into operation at one of the speeds as designated by I, II and III, first the exciting current for the main coupling is weakened by switching a greater or smaller amount of the resistances 27 into the circuit leading to the current source 34. Thereupon the controlling switch consisting of the drum 36 and the contact arm 37 is rotated and the exciter winding of that coupling which is desired to be operated inserted into the circuit leading to the battery 34. If, for instance, the coupling 9 is desired to be put into action, the contact arm 37 is rotated into the position as illustrated, whereby the contact 40 will engage the contact 41. By this contact the circuit including the solenoid 30 will be closed. The core of the solenoid 30 will now be attracted and thereby the pawl or locking lever 28 lifted out of the recess 28ª provided on the disc 24. Now the switch or contact arm 25 may be further moved, in order to again switch the parts of resistance 27 out of circuit which had been switched in series with the exciter-winding of the main coupling 3. The pressure exerted between the two members of the coupling will thereby again be augmented. It is obvious that a releasing of the pawl or locking lever 28 cannot take place before one of the contact pieces 38, 39 and 40 has come in engagement with the contact 41, so that the controller 24—25 will remain in locked condition and so that the pressure exerted between the two members of the main coupling 3 can not be augmented. The position of the contacts 38, 39 and 40 with respect to the contacts of the controller which establish the connections for the conductors 44, 45, 46 and 47 for the exciter-windings of the couplings for the variable speed drive is such that the contacts 38, 39 and 40 are engaging the contact 41, if the circuits are closed which form part of the respective couplings for the variable speed drive.

I claim:

1. In a Diesel-locomotive, the combination of a Diesel engine, a transmission gear including an electromagnetic main coupling and a variable speed drive consisting of a plurality of gear wheels loosely mounted on their shafts and adapted to be alternately fixed to the shafts by means of electromagnetic friction couplings and of a retarding device consisting in a resistance-switch for the main coupling, a selector for alternately closing the exciting circuit of one of the couplings of the variable speed drive, and electromagnetic means between said resistance-switch and the selector, said means being adapted to lock the switch in that position according to which the resistance is switched into the exciting circuit of the main coupling, the said locking being effected as long as the exciting circuit of one of the couplings of the variable speed drive is not closed by the selector.

2. In a Diesel-locomotive, the combination of a Diesel-engine, a transmission gear including an electromagnetic main coupling and a variable speed drive consisting of a plurality of gear wheels loosely mounted on their shafts and adapted to be alternately fixed to the shafts by means of electromagnetic friction couplings and of a retarding device, comprising a switch for the main coupling, a selector for alternately closing the exciting circuit of one of the couplings of the variable speed drive, an electromagnetically operated catch lever adapted to lock the switch of the main coupling and being in electrical connection with the selector in such a way that the catch lever is electromagnetically operated to release the switch as soon as the selector is in a position in which the exciting circuit of one of the couplings of the variable speed drive is closed.

In testimony whereof I affix my signature.

JULIUS BING.